Dec. 18, 1934.   W. SYKES   1,985,000
POWER TRANSMISSION SYSTEM
Filed Feb. 7, 1931
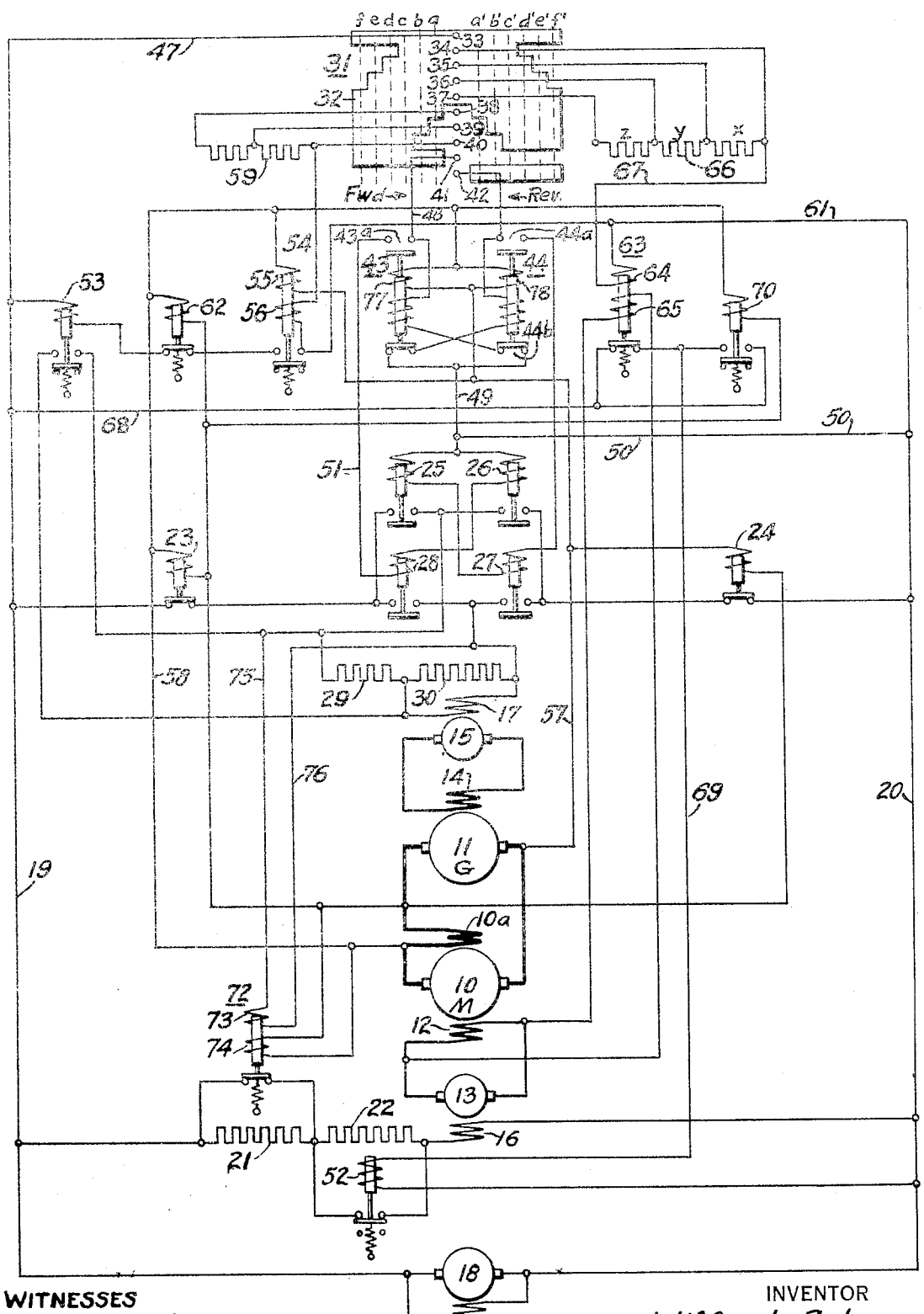
WITNESSES
Leon J. Taza
G. M. Crawford
INVENTOR
Wilfred Sykes
BY
Wesley G. Carr
ATTORNEY Patented Dec. 18, 1934

1,985,000

UNITED STATES PATENT OFFICE 1,985,000

POWER-TRANSMISSION SYSTEM

Wilfred Sykes, Chicago, Ill., assignor to Westinghouse Electric & Manufacturing Company, a corporation of Pennsylvania Application February 7, 1931, Serial No. 514,195

16 Claims. (Cl. 172—239)

My invention relates generally to power-transmission systems and more particularly to systems embodying a generator and a motor connected in closed-circuit relation and suitable for operating rolling mills, hoists and machines of similar nature.

The object of my invention, generally stated, is to provide a power-transmission system which shall be simple and efficient in operation and which may be economically manufactured and installed. A more specific object of my invention is to provide, in a power-transmission system of the above specified character, for controlling the field excitation of the generator to cause the generator to rapidly develop a desired voltage and to thereafter automatically maintain the preselected generator voltage at a substantially constant value, regardless of changes in load.

A further object of my invention is to provide, in a system of the above specified character, for varying the speed of the motor over a predetermined operating range by utilizing regulating means jointly responsive to a voltage determined by the position of a master switch and the voltage of a motor exciter.

Another object of my invention is to provide, in a system of the above character, for utilizing a single excitation-controlling means for rapidly varying the generator excitation to raise and lower the voltage to the desired value and for thereafter maintaining the voltage at the selected value.

A still further object of my invention is to provide for varying the excitation of the motor to effect the desired speed changes by means of a single excitation-controlling means, which is also automatically operable to maintain the excitation of the motor at a substantially constant value, regardless of load variation.

In accordance with my invention, a generator and a motor are permanently connected in closed-circuit relation. The speed of the motor, up to a predetermined value, is controlled by varying the generator voltage, and the direction of rotation of the motor is controlled by changing the direction of the generator voltage.

The speed of the motor is further controlled by varying its field excitation to obtain maximum speed with full generator voltage.

The voltage of the main generator is controlled by varying the excitation of an exciter which is connected across the generator field winding. The excitation circuit of the exciter includes a resistor disposed to be shunted in accordance with the operation of a differential or balance relay, which is responsive to the generator voltage and the position of the master switch. Until the generator voltage reaches the value which corresponds to the position of the master switch, the differential relay causes the field resistor, in the excitation circuit of the exciter, to remain shunted to greatly over-excite the generator which causes it to build up its voltage quickly. When the generator has developed the desired voltage, as determined by the position of the master switch, the differential relay then functions as a regulator to maintain the voltage at a substantially constant value.

When the voltage of the generator has been raised to maximum or normal value, the speed of the motor is further increased by a second differential or balance relay that is responsive to the voltage impressed across the motor field winding by its exciter and the position of the master switch. When the master switch is actuated to different positions, the differential relay causes a field shunting switch to remain energized and closed to shunt a resistor in the excitation circuit of an exciter until the voltage impressed on the motor field winding and, consequently, the motor excitation reaches a value which corresponds to the master-switch position. After the motor has been accelerated to the desired speed, this differential relay functions as a regulator to maintain the field excitation of the motor at a substantially constant value, as determined by the position of the master switch.

My invention will be described in connection with the accompanying drawing, in which the single figure is a diagrammatic view of a power-transmission system embodying the principal features of my invention.

Referring now to the drawing, 10 is a direct-current motor which may be utilized for driving a rolling mill or a hoist. As shown, the motor is connected in closed-circuit relation to a direct-current generator 11, which may be driven at a substantially constant speed by a motor, a turbine or other suitable means, to supply direct-current power to the motor 10.

The motor 10 is provided with a shunt field winding 12, connected directly across the armature of an exciter 13 which will be referred to hereinafter as the motor exciter. The exciter 13 is preferably driven by a separate motor, in a manner well known in the art.

The generator 11 is provided with a shunt field winding 14, connected across the armature of an exciter 15 hereinafter referred to as the generator exciter, which is also separately driven as the motor exciter 13.

Excitation current for the field windings 16 and 17, of the exciters 13 and 15, and current for operating the various relays of the system, may be obtained from any suitable source of constant voltage, such, for example, as auxiliary generator 18.

As shown, the field winding of the exciter 13 is connected directly across line conductors 19 and 20, which are connected to the positive and negative brushes, respectively, of the auxiliary generator 18, through resistors 21 and 22, the function of which will be more fully described hereinafter.

The field winding 17, of the exciter 15, is likewise connected across the line conductors 19 and 20, through an over-current relay 23, and over-voltage relay 24, and a plurality of reversing switches 25 to 28, inclusive, which are utilized to reverse the exciter voltage and, consequently, the generator excitation to control the direction of operation of the motor in a well-known manner.

The field circuit of the exciter 15 also contains a field resistor 29 and a field-discharge resistor 30, the latter being connected in shunt relation to the field winding 17.

In order to control the operation of the system, a master switch 31 is provided which comprises a movable segment 32, disposed to be actuated in forward and reverse directions, as shown, to engage or disengage stationary contact fingers 33 to 42, inclusive.

Directional relays 43 and 44, responsive to the operation of the master switch, are provided for controlling the energization of the reversing switches 25 and 28 which control the field circuit of the generator exciter 15.

In order that the novel features of my invention may be more readily understood, the operation of the system will be described in detail. In this embodiment of the invention, provision is made for varying the speed of the motor 10 in two different ways. First, the speed of the motor 10 is controlled by varying the generator voltage while having full field excitation on the motor, and second, by holding the generator voltage steady at its normal value and varying the field excitation of the motor. The direction of rotation of the motor is controlled by changing the direction of the voltage developed by the generator.

In order to set the system in operation, the generator 11 is first started and brought up to its normal operating speed by starting its driving motor or turbine, in the usual manner.

The generator 11 may be caused to develop a voltage to effect the operation of the motor 10 in a forward direction by actuating the master switch to position "a" in the forward direction, to effect the operation of the forward-direction relay 43, which, in turn, closes an energizing circuit for reversing switches 26 and 28.

As will be observed, when the master switch 31 is in the "a" position, stationary contact members 33 and 41 are bridged to establish a circuit from line conductor 19, through conductor 47, contact members 33 and 41, bridged by the segment 32, conductor 48, operating coil of relay 43, back contact members 44b and conductors 49 and 50, to line conductor 20.

Upon the closure of relay 43, a branch circuit is completed from the energized conductor 48, through contact members 43a, conductor 51, operating coils of reversing switches 28 and 26 and conductor 50, to the line conductor 20.

In response to the operation of the reversing switches 28 and 26, the field winding 17, of the exciter 15, is connected across the auxiliary source comprising the line conductors 19 and 20, through a circuit extending from line conductor 19, through over-current relay 23, switch 28, field winding 17 and discharge resistor 30 connected in parallel, field resistor 29, switch 26 and over-voltage relay 24, to the line conductor 20. In this instance, the field resistor 29 has a relatively large resistance value and, consequently, the voltage developed by the exciter 15 will be so low that the generator voltage will only build up to a slight degree.

As described hereinbefore, field winding 16, of the motor exciter 13, is connected directly across the line conductors 19 and 20, and, since the relay 52, disposed to shunt the resistor 22, stands closed, the exciter develops its maximum voltage and, consequently, the motor 10 operates at full field excitation. Under these conditions, the speed of the motor is controlled entirely by varying the generator voltage.

In this embodiment of the invention, the generator voltage is controlled by intermittently shunting the field resistor 29 in the excitation circuit of its exciter 15. The field resistor is shunted by means of a shunting relay 53 which may be of any suitable type, preferably of the spring-biased type, as shown.

In order to control the operation of the shunting relay 53 a differential or balance relay 54 is provided having a spring-biased armature and differentially related operating coils 55 and 56. As shown, the coil 55, which functions to effect the opening of the relay, is connected directly across the armature of the generator 11, through conductors 57 and 58. The coil 56, which functions to effect the closure of the relay, is disposed to be energized from the auxiliary source at various voltages controlled by the master switch 31 and a resistor 59.

As shown, when the master switch 31 is actuated to the "a" position in the forward direction, contact members 33 and 38 are bridged to establish a circuit from the line conductor 19, through conductor 47, contact members 33 and 38, bridged by the segment 32, resistor 59, coil 56 and conductor 61, to the line conductor 20. Since, at this time, the energization of the coil 55 is slight, because of the low generator voltage, the balance relay 54 is actuated to its closed position to establish an energizing circuit for the shunting relay 53. This circuit extends from line conductor 19, through the coil of relay 53, contact members of the relay 62, contact members of relay 54 and conductor 61, to line conductor 20.

As will be readily understood, operation of the relay 53 shunts the field resistor 29, greatly increasing the voltage of the generator exciter 15, which causes the generator voltage to rapidly increase. These conditions prevail until the voltage of the generator 11 has increased to a predetermined value, when the coil 55 of the differential relay 54 becomes sufficiently energized to balance the effect of coil 56, and the armature is positively actuated, by its biasing spring, to open the contact members of the relay.

The opening of differential relay 54 interrupts the energizing relay 53, and, consequently, decreases the voltage of exciter 15 to reduce the generator voltage, and the differential relay 54 again functions, in exactly the same manner, to again increase the generator voltage.

So long as the master switch 31 remains in the "a" position, the differential relay 54 will function, in the above-described manner, to alternately increase and decrease the excitation of the generator 11 and thereby maintain a constant voltage corresponding to the position of the master switch. The voltage thus maintained will cause the motor 10 to operate at a substantially constant speed as determined by the position of the master switch.

The voltage of the generator 11 may be further increased, to increase the speed of motor 10, by actuating the master switch to its "b" and "c" positions, respectively, which operation increases the voltage impressed upon the coil 56 of the differential relay 54 by shunting out sections of the resistor 59 and, consequently, requires that the generator 11 develops a greater voltage to cause the coil 55 to become energized to a sufficient degree to balance the effect of the coil 56 and cause the operation of the differential relay 54 in the manner described hereinbefore.

When the master switch 31 has been actuated to the "c" position, the voltage of the generator 11 has reached its maximum or normal value, and, in order to further increase the speed of the motor 10, provision is made for varying the field excitation of the motor in somewhat the same manner as was described for controlling the voltage of the generator.

As shown, the field resistor 22, in the excitation circuit of the motor exciter 13, is disposed to be shunted by switch 52, normally held in its closed position, as shown.

In order to control the speed of the motor in this manner, it has been found desirable to provide control means to be responsive to the position of the master switch and to the voltage impressed upon the motor field winding instead of means to be responsive to the position of the master switch and to the voltage of the generator, as described hereinbefore.

In this instance, the shunting relay 52 is controlled by means of a differential or balance relay 63, similar, in construction, to relay 54 and having differentially-related operating coils 64 and 65. It is to be observed, however, that relay 63 is normally biased to its closed position, by means of a suitable biasing spring, when its coils 64 and 65 are deenergized or are energized by equal voltages.

In order to cause the differential relay 63 to function in accordance with the position of the master switch and the voltage impressed upon the motor field winding 12, its coil 64 is also disposed to be energized from the auxiliary source, through the resistor 66, at various voltages determined by the position of the master switch. Its coil 65 is connected directly across the motor field winding 12, as shown.

It will be observed that, while the master switch 31 is still in the "c" position, stationary contact fingers 34 to 37 are bridged, and, consequently, coil 64 of the differential relay 63 is fully energized over a circuit extending from line conductor 19, through conductor 47, contact fingers 33 and 34—bridged by segment 32—conductor 67, coil 64 and conductor 61, to the line conductor 20. When this condition exists, the forces exerted by coils 64 and 65 are substantially equal and opposite, and the armature is actuated by the biasing spring to close the contact members of the relay. This establishes a circuit extending from line conductor 19, through conductor 68, contact members of relay 63, conductor 69 and shunting switch 52, to line conductor 20, which causes the shunting relay 52 to be held in the closed position to cause the motor exciter 13 to develop maximum voltage and to provide maximum excitation for the motor 10, which was the condition existing at the time the motor 10 was being accelerated and controlled by varying the generator voltage.

In order to increase the speed of the motor, the master switch 31 may be actuated to the "d" position where it disengages contact member 34, thereby inserting a section $x$ of resistor 66, in the energizing circuit of the coil 64. This reduces the energization of coil 64 and, consequently, permits the coil 65 to effect the opening of the contact members of relay 64 to interrupt the above described energizing circuit of the shunting switch 52. Upon the opening of the shunting switch 52, the field resistor 22 is rendered effective to reduce the voltage of the exciter 13 and, consequently, the excitation of the motor 10, which tends to increase the speed of the motor.

When the voltage impressed upon the field winding 12 has been sufficiently reduced, the differential relay 63 is again actuated to its closed position to again effect the operation of the shunting switch 52 to increase the voltage of the exciter which tends to decrease the speed of the motor 10.

It is to be understood, however, that, when the motor speed has been raised to a value corresponding to the position of the master switch, to cause the differential relay 63 to function in the above described manner, this relay then functions as a regulator to maintain the excitation of the motor at such average value that its speed will be maintained at the preselected value.

The speed of the motor 10 may be further increased by actuating the master switch to its "e" and "f" positions, to insert sections $y$ and $z$, of the resistor 66, in circuit with coil 64 which further decreases the energization of the coil 64. This causes the differential relay 63 to function in the manner described hereinbefore to further reduce the average excitation of the motor 10.

In order to limit the amount of load current delivered by the generator to a safe value, during the acceleration period, the operating coil of the over-current relay 62 is connected in shunt relation to the compensating field 10a of the motor 10. As described hereinbefore, the energizing circuit for the shunting relay 53, which controls the generator-exciter voltage, extends through the contact members of relay 62, and, consequently, when it is opened by excess current flowing in the main circuit, the generator voltage is decreased, regardless of the position of the differential relay 54.

In order to further protect the motor and the generator from overload, when the motor 10 is being accelerated by varying its field excitation, a second excess-current relay 70 is provided which has its operating coil also connected across the compensating field 10a of the motor. As shown, the contact members of relay 70 are connected in parallel to those of the differential relay 63, in the energizing circuit for shunting relay 52, and, when closed, maintain the shunting relay 52 energized, regardless of the position of the differential relay 63. Therefore, should the current in the main circuit exceed a predetermined value, somewhat in excess of that necessary to effect the operation of excess-current relay 62, the voltage of exciter 13 will be immediately increased to increase the excitation of the motor 10 and, consequently, decrease its speed. The decrease in speed of the motor reduces its load to a safe value, where the differential relay 63 is again rendered effective.

In order to reduce the speed of the motor, the master switch is actuated from its "f" position towards the "off" position to gradually increase the voltage impressed upon the coil 64 of differential relay 63 until the "c" position is reached. This causes the coil 64 to overcome the opposing coil 65, thereby holding the relay 63 in the closed position to maintain an energizing circuit for the shunting switch 52. This provides maximum exciter voltage and, consequently, the motor 10 decelerates at full field excitation.

Further movement of the master switch towards the "off" position reduces the voltage impressed upon coil 56 of differential relay 54, while the opposing coil is still subjected to full generator voltage which causes the relay contact members to be held in their open positions to provide minimum excitation for the generator.

If, during this period of regeneration, the current flowing in the main circuit should still exceed a predetermined value, the differential relays 54 and 63 would not be further effective to provide additional protection; therefore, in order to further protect the generator and the motor, during this period of regeneration, a differential or balance relay 72 is provided. As shown, the armature of the relay 72 is spring-biased to its closed position to shunt a resistor 21 in the excitation circuit of the motor exciter 13 and is provided with differentially-related coils 73 and 74. The coils 73 and 74 are so designed as to develop unequal forces when energized for a purpose which will be described hereinafter. Coil 73, which does not develop as strong a field as coil 74, is connected across the generator exciter field circuit between the directional switches 25—26 and 27—28 by means of conductors 75 and 76 to be energized from the auxiliary source represented by line conductors 19 and 20. The polarity of the voltage which is impressed upon coil 73 is determined by the operation of the directional switches which respond to the operation of the master switch. Coil 74, which is the stronger of the two, is shunted across the compensating field winding 10a, of the motor 10, and is energized in accordance with the load current flowing in the main circuit.

When the system is operating under normal conditions, with the generator supplying power to the motor, the coils 73 and 74, of relay 72, are acting in opposition and may be so designed as to prevent operation of the relay even though the current in the main circuit exceeds a value sufficient to effect the operation of excess-current relays 62 and 70. However, when the motor is retarding, it is regenerating, and the direction of flow of load current in the main circuit is reversed which causes coils 73 and 74, of relay 72, to act cumulatively. When the motor current exceeds a predetermined value, relay 72 then operates to render resistor 21 effective and thereby further decrease the excitation of the motor 10.

In order to more clearly understand the sequence of operation of the excess-current relays 62 and 70 and the relay 72, it may be assumed that excess-current relay 62 is set to operate at 6000 amperes of current flowing in the main circuit, and the excess-current relay 70 at 5500 amperes. The windings of relay 72 will then be so designed that it will require approximately 7,000 amperes flowing in the main circuit, during the period of acceleration, or under steady-load conditions, to effect its operation.

However, when the motor 10 is retarding, its current reverses and, consequently, coils 73 and 74 of relay 72 pull in the same direction and may be caused to effect the operation of the relay when the motor current reaches approximately 6000 amperes.

In view of the foregoing, it will be readily understood that provision is made for limiting the load current of the generator and the motor in every stage of operation. Excess-current relay 62 functions to keep the load current below a predetermined value when the motor is being controlled by varying the generator voltage. Excess-current relay 70 functions in the same manner when the speed of the motor is being controlled by varying its excitation, and relay 72 limits the current in the main circuit when the motor is retarding.

In order to prevent a reversal of the generator voltage before the voltage has decreased to a predetermined value, and the speed of the motor is reduced to a comparatively low value, the directional relays 43 and 44, controlled by the master switch 31, are provided with holding coils 77 and 78, as shown. These coils are connected in parallel across the armature of generator 11, through conductors 57 and 58, and are so designed as to hold their respective relays in closed position until the generator voltage drops to a predetermined value, even though the master switch has been actuated to the reverse position.

Since, in this embodiment of the invention, the generator exciter 15 is disposed to greatly over-excite the generator when the resistor 29 is shunted, the relay 23 in the excitation circuit of exciter 15 is designed to open its contact members to interrupt the excitation circuit in the event the current flowing in the main circuit exceeds a predetermined maximum value. For example, relay 23 would function in the event that the shunting relay 53 should stick in its closed position, which would cause the generator 11 to develop a voltage greatly in excess of normal value.

In this embodiment of the invention, relays 54 and 63 have been illustrated as differential relays. However, it will be readily understood that relays of the balanced type could readily be substituted to perform the same function in an equally effective manner.

Since the operation of the system, when the master switch 31 is actuated in the reverse direction, is exactly the same as has been described hereinbefore, it has been deemed unnecessary to describe it in detail.

In view of the foregoing description, it will be apparent that a power-transmission system constructed in accordance with my invention has many advantages over the systems which have been used heretofore.

Since the generator voltage is controlled entirely by varying the excitation of its exciter, only a very simple arrangement of relays is necessary to cause the generator to develop the desired voltage and to thereafter maintain the voltage at a substantially constant value as the load varies. The differential or balance relay 54 functions to cause the generator exciter to apply excess excitation voltage to the generator when its voltage is below that which corresponds to the position of the master switch to effect a rapid development of generator voltage. After the generator voltage has developed to the desired value, the differential relay functions as a regulator to hold the voltage at this value, thereby making it unnecessary to employ both a regulator and field-forcing relays to obtain the same results.

The same is true with respect to the differential relay 63, which functions in the same manner as relay 54, to control the excitation of the motor 10.

It may be stated, in conclusion, that, while the illustrated example constitutes a practical and desirable embodiment of my invention, I do not wish to limit myself strictly to the exact details herein illustrated since modifications of the same may be made without departing from the spirit of the invention, as defined in the appended claims.

I claim as my invention:

1. In an electrical system, the combination with a motor, a generator connected in series-circuit with the motor and a separately-driven exciter for the generator, of means for controlling the voltage of the exciter to effect an initial over-excitation of the generator and thereafter to maintain the generator voltage at a substantially constant value, said means comprising a relay differentially responsive to the voltage of the generator and directly to predetermined voltages obtained from a separate source proportional to the desired generator voltage.

2. In an electrical-transmission system, the combination with a generator and a motor having their armatures connected in series-circuit relation, of means including a balance relay and an exciter for controlling the excitation of the generator in accordance with the voltage of said generator, and means for controlling said excitation-controlling means to cause said means to function automatically to maintain different predetermined generator voltages regardless of generator load.

3. In a power-transmission system, in combination, a work motor, a generator for supplying variable-voltage power to the motor, said generator and motor being connected in closed-circuit relation, a master switch, means for controlling the excitation of the motor, an exciter for the generator, and means including a balance relay responsive to control voltages as determined by the operation of the master switch for controlling the voltage developed by the exciter, said means including the balance relay being further operable in response to the generator voltage and a selected control voltage to control the exciter voltage for maintaining said generator voltage at a substantially constant value as determined by the position of the master switch.

4. In a power-transmission system, in combination, a work motor, a generator provided with a field winding connected for supplying variable-voltage power to said work motor, means for driving the generator, means for supplying exciting current to the motor, an exciter connected to the field winding of the generator, a master switch, means including a differential relay responsive to different predetermined voltages as determined by the setting of the master switch for varying the excitation of the exciter, said differential relay being further responsive to the voltage developed by the generator to regulate the excitation of the exciter, to maintain the generator voltage at substantially the same value as determined by the position of the master switch.

5. In an electrical system, in combination, a generator having a field winding, a separately-driven exciter for energizing the field winding, a source of power, a controller having a plurality of positions, an excitation circuit for the exciter connected to the source of power and including a resistor, a relay operable to shunt the resistor, and a relay having differentially disposed windings for controlling the operation of the shunting relay to control the effectiveness of said field resistor, one of said windings being energized directly from the power source at a voltage proportional to the position of the controller and the other being connected across the generator terminals to cause the differential relay to control the operation of the shunting relay to regulate the voltage of the exciter so as to maintain a substantially constant generator voltage corresponding to the position of the controller.

6. An electrical system comprising a generator, an exciter for said generator, a controller, and means including a regulator device for controlling the excitation of the exciter, said regulator device being directly responsive to a control voltage determined by the operation of the controller for temporarily effecting an excessive change in the exciter voltage and further responsive to the generator voltage and said selected control voltage to maintain an average exciter voltage sufficient to cause the generator to develop a voltage corresponding to the position of the controller.

7. In a power-transmission system, in combination, a motor, a generator for supplying power to said motor, means for controlling the excitation of the motor, a master switch operable to a plurality of positions, a source of constant potential, an exciter for said generator, an excitation circuit including a resistor for the exciter, a relay operable to shunt the resistor, relay means for controlling the energization of said relay, said relay means being differentially responsive to different predetermined voltages obtained from the source of constant potential as determined by the position of the master switch and to the generator voltage to cause the generator voltage to be raised to a value corresponding to the position of the master switch and thereafter maintained at said predetermined value as the load on the generator changes and means operable in response to the generator load exceeding a predetermined value for rendering said differentially responsive means ineffective to control the resistor shunting relay.

8. In an electrical-transmission system, the combination with a generator and a motor provided with a field winding having their armatures connected in series-circuit relation, a master switch and means for controlling the excitation of the generator, of an exciter for supplying excitation current to the field winding of the motor, means for controlling the excitation of the exciter in accordance with the relative values of a voltage impressed upon the field winding of the motor and a voltage dependent upon the position of the master switch, and means responsive to the motor current for controlling the effectiveness of said means for controlling the excitation of the exciter.

9. In a power-transmission system, in combination, a work motor, a generator for supplying variable-voltage power to the work motor, said generator and motor being connected in closed-circuit relation, a master controller, means responsive to the setting of said master controller and to the generator voltage for controlling the excitation of the generator, a source of excitation current for the motor and means responsive to predetermined voltages determined by further operation of the controller and to the voltage of the excitation source for controlling the voltage of the excitation source and the speed of the motor.

10. In an electrical system, the combination, with a motor and a generator having their armatures connected in closed-circuit relation, a separate exciter for the motor and the generator, and a source of power, of a controller operable to a plurality of positions for varying the voltage of the source of power, means differentially responsive to the generator voltage and to a predetermined voltage from the power source as determined by the position of the controller for controlling the voltage of the generator exciter, and means differentially responsive to the excitation voltage of the motor and to a predetermined voltage from the power source as determined by the position of the controller for controlling the voltage of the motor exciter.

11. In a power-transmission system, in combination, a work motor, a generator for supplying power to said work motor, means including a master switch for varying the generator voltage to control the speed of the motor between predetermined limits, an exciter for the motor, and means jointly responsive to a voltage determined by the position of the master switch and to the exciter voltage for varying the excitation of the exciter to further control the speed of the motor.

12. In a power-transmission system, in combination, a work motor, a generator for supplying power to said work motor, means including a master controller for varying the generator voltage to control the speed of the motor between predetermined limits, an exciter for the motor, means jointly responsive to a voltage determined by the position of the master controller and to the exciter voltage for varying the excitation of the exciter to further control the speed of the motor, and means responsive to the motor current for causing the exciter to develop maximum voltage in the event the motor current exceeds a predetermined amount.

13. In a power-transmission system, in combination, a motor, a generator for supplying power to the motor, a source of excitation for the generator, means including a differential relay operable to control the voltage of the excitation source, a constant potential source of power, and means including a controller for impressing predetermined voltages from the power source directly upon said differential relay dependent upon the setting of the controller, said differential relay also being responsive to the voltage of the generator whereby the means including the differential relay is operated to maintain the generator voltage at a substantially constant value, as determined by the setting of the controller, as its load varies.

14. In a power-transmission system, in combination, a motor, a generator for supplying power to the motor, a source of excitation for the generator, means including a relay having opposed windings for controlling the voltage of the excitation source, a source of constant potential power, and rheostatic means operable to impress voltages of different predetermined values from the power source on one of said relay windings, said other relay winding being energized in accordance with the generator voltage thereby to cause said means including the relay with opposed windings to automatically maintain a predetermined generator voltage regardless of load variation.

15. In a power-transmission system, in combination, a motor, a generator for supplying power to the motor, means including a controller for varying the generator voltage to control the speed of the motor within predetermined limits, an exciter for the motor, means jointly responsive to a control voltage determined by the position of the controller and to the exciter voltage for varying the excitation of the exciter to further control the speed of the motor, means operative in response to the motor current exceeding a predetermined value when receiving power from the generator for increasing the exciter voltage to a predetermined value and means operative in response to the regenerative current of the motor exceeding a predetermined value when the controller is actuated so as to obtain regenerative braking for decreasing the voltage of the exciter.

16. In a power-transmission system, in combination, a motor, a generator for supplying variable voltage power to the motor, an exciter for supplying excitation current to the generator, an energizing circuit including a resistor for the field winding of the exciter, a plurality of reversing switches for controlling the excitation circuit of the exciter to reverse the polarity of the generator and direction of rotation of the motor, a switch operable to shunt the resistor in the exciter field circuit, a relay having differentially related operating coils for controlling the operation of the shunting switch, one of said relay coils being energized in proportion to the generator voltage and the other of said coils being connected to a constant voltage source through a resistor, and a controller operable to a plurality of positions for controlling the operation of the exciter reversing switches and for controlling the effectiveness of the resistor in the relay coil circuit to cause the differential relay and shunting switch to control the voltage of the exciter and consequently the excitation of the generator to raise and maintain the generator voltage in accordance with the position to which the controller is operated.

WILFRED SYKES.